United States Patent [19]
Baczek et al.

[11] 4,290,865
[45] Sep. 22, 1981

[54] RECOVERING COPPER FROM A COPPER-BEARING SOURCE

[75] Inventors: Frank A. Baczek, Sandy; Bruce C. Wojcik, Kearns; Alexander A. Jueschke; Daniel M. Lewis, both of Salt Lake City; Jack C. Otto, Magma; Lawrence L. Tuttle, Sandy, all of Utah

[73] Assignee: Envirotech Corporation, Menlo Park, Calif.

[21] Appl. No.: 114,477

[22] Filed: Jan. 23, 1980

[51] Int. Cl.³ .................................................. C25C 1/12
[52] U.S. Cl. .................................... 204/106; 204/108; 75/117
[58] Field of Search ................ 413/37; 204/108, 106; 75/117; 423/37

[56] References Cited
U.S. PATENT DOCUMENTS

| | | | |
|---|---|---|---|
| 3,218,161 | 11/1965 | Kunda et al. | 75/108 |
| 3,876,516 | 4/1975 | Pace et al. | 204/108 |
| 3,957,602 | 5/1976 | Johnson et al. | 204/106 |
| 4,003,740 | 1/1977 | Huggins et al. | 204/108 |

OTHER PUBLICATIONS
1,020,363 111977 CAX 53 290

Primary Examiner—R. L. Andrews
Attorney, Agent, or Firm—Robert E. Krebs; T. J. McNaughton

[57] ABSTRACT

A system and process are provided for recovering copper from a contaminated copper-bearing source such as copper smelter flue dust. The copper-bearing source is leached in an acidic solution to produce a liquor containing dissolved copper and dissolved contaminants. Simple copper sulfides are precipitated from the liquor by reacting the liquor with chalcopyrite and sulfur dioxide. Copper is recovered from the precipitated sulfides.

A novel process is provided for precipitating simple copper sulfides from a solution containing both dissolved copper and dissolved contaminants. The solution is combined with precipitation product such that substantially all ferric iron contained in the solution is reduced to ferrous iron. The ferric-free solution is reacted with chalcopyrite solids and sulfur dioxide to precipitate the dissolved copper as simple copper sulfides.

12 Claims, 7 Drawing Figures

RECOVERING COPPER FROM A COPPER-BEARING SOURCE

BACKGROUND OF THE INVENTION

1. Field of the Invention

The present invention relates generally to a process and system for recovering copper from a contaminated copper-bearing source and more particularly to a hydrometallurgical process and system for precipitating copper from a contaminated copper-bearing solution.

2. Brief Description of the Prior Art

The most difficult aspect of recovering copper from a contaminated source such as copper smelter flue dust, refinery waste or other copper-bearing waste streams is the clean-cut separation of the copper from the contaminants in a form suitable for further processing. To date, the predominantly utilized separation techniques have been either the removal of the contaminants from a solution containing both dissolved copper and dissolved contaminants by precipitating the contaminants at high temperatures and pressures or the removal of the copper from the contaminated solution by liquid ion exchange. Each method requires both costly equipment and costly reagents.

Other hydrometallurgical processes have been developed for separating copper from a contaminated source by precipitating the copper from an acidic solution as a sulfide while leaving the contaminants in solution. In one such process, the pH of the solution is adjusted to an initial value of less than 4 and elemental sulfur or cupric sulfide is dispersed into the solution. With the simultaneous introduction of gaseous sulfur dioxide to the solution, the following reactions occur:

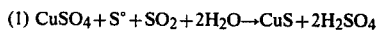

(1) $CuSO_4 + S° + SO_2 + 2H_2O \rightarrow CuS + 2H_2SO_4$

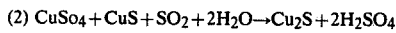

(2) $CuSo_4 + CuS + SO_2 + 2H_2O \rightarrow Cu_2S + 2H_2SO_4$

The precipitated copper sulfides are then separated from the solution and further processed to recover pure copper.

SUMMARY OF THE INVENTION

A process and system are provided for recovering copper from a contaminated copper-bearing source such as copper smelter flue dust. The copper-bearing source is leached in a sulfuric acid leach solution to produce a copper sulfate solution. Simple copper sulfides are then precipitated from the copper sulfate solution by reacting the solution with chalcopyrite and sulfur dioxide. Copper is recovered from the simple copper sulfides.

A novel process for precipitating simple copper sulfides from a copper sulfate solution is also provided. The copper sulfate solution is first mixed with previously precipitated sulfides such that substantially all of the ferric iron contained in the copper sulfate solution is reduced to ferrous iron. Sulfur dioxide and chalcopyrite are then introduced to precipitate simple copper sulfides. Reduction of ferric iron prior to sulfur dioxide addition lowers the EMF of the mixture and, thus, increases the rate of the precipitation reaction.

DESCRIPTION OF A PREFERRED EMBODIMENT

Figure 1:
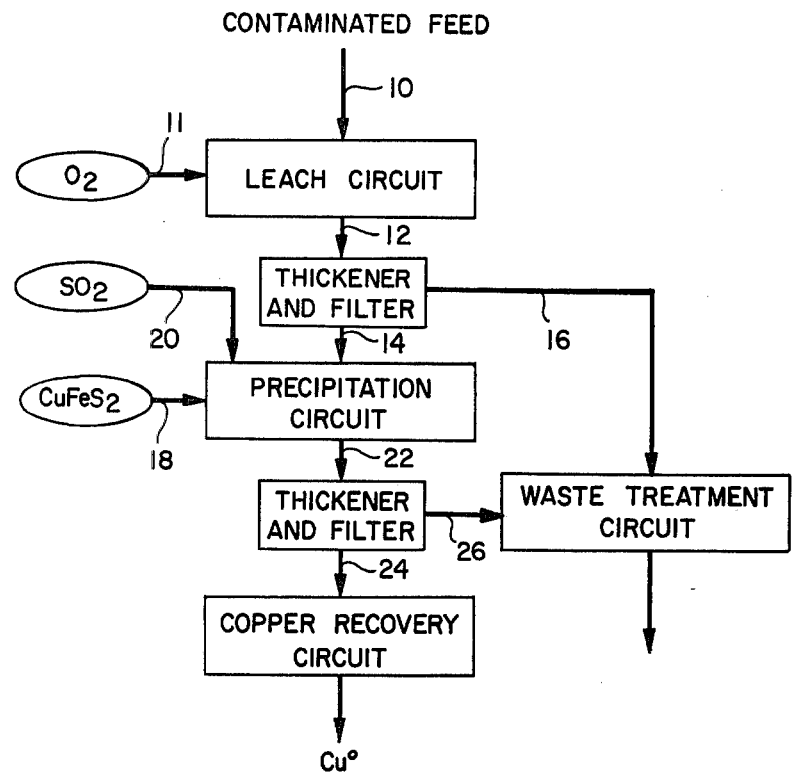
FIG. 1 is a schematic illustration of a flowsheet of the process of the present invention.

The general flowsheet of the process of the subject invention, shown in FIG. 1, includes four major treatment circuits: a leach circuit for dissolving both copper and contaminants from a copper-bearing feed material to provide a pregnant liquor containing dissolved copper as copper sulfate, a precipitation circuit for precipitating copper from the pregnant liquor as simple copper sulfides while leaving the contaminants in solution, a recovery circuit for recovering copper from the copper sulfide precipitate, and a waste treatment circuit for neutralizing the waste streams generated in the other circuits.

Referring to FIG. 1, a contaminated copper-bearing feed material, e.g. copper smelter flue dust, is introduced to the leach circuit via line 10. In the leach circuit, the feed material is leached in a sulfuric acid leach solution to produce a pregnant liquor which contains both dissolved copper and dissolved contaminants. The leach circuit is designed such that the pregnant liquor produced in the leach circuit contains less than about 5 gpl ferric iron. The initial sulfuric acid concentration of the leach solution is greater than about 150 gpl. Ferric iron required for the leach reaction is generated in-situ in the leach circuit by introducing oxygen into the leach solution via line 11 as described below. The retention time in the leach circuit is about 4-6 hours and the temperature is maintained at about 80° C.

The slurry, that is, the pregnant liquor and residual solids, from the leach circuit is directed via line 12 to a thickener/filter wherein it is subjected to liquid-solids separation. The residual solids from the thickener/filter are directed via line 16 to the waste treatment circuit. The pregnant liquor from the thickener/filter is directed via line 14 to the precipitation circuit.

The pregnant liquor from the leach circuit, which contains about 15-45 gpl dissolved copper as copper sulfate, is reacted in the precipitation circuit with chalcopyrite introduced via line 18 and with sulfur dioxide introduced via line 20 to precipitate copper from solution as simple copper sulfides, primarily covellite and digenite, while leaving the contaminants in solution.

The slurry from the precipitation circuit is directed via line 22 to a second thickener/filter wherein the precipitated copper sulfides are removed from the remaining contaminated liquor and directed via line 24 to a recovery circuit for recovery of copper by conventional techniques. The contaminated liquor is directed via line 26 to the waste treatment circuit for neutralization and precipitation of salts.

Figure 2:
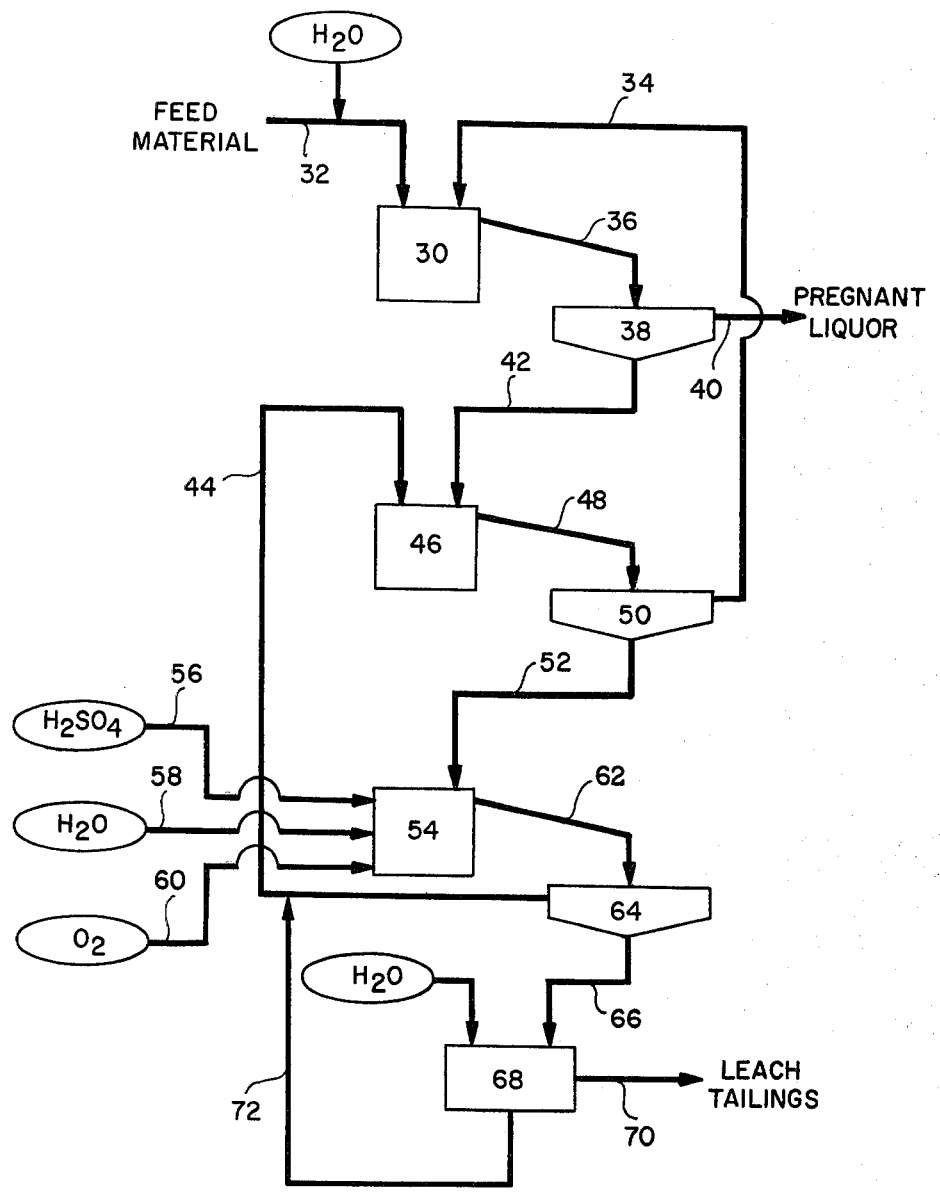
FIG. 2 is a schematic illustration of a leaching circuit according to the present invention.

FIG. 2 illustrates a preferred multi-stage, countercurrent, sulfuric acid leach circuit. The purpose of the leach circuit is to dissolve copper from the feed material. A strong acid concentration is required in the leach circuit to achieve the desired copper dissolution. As discussed below, each successive leach stage introduces the feed material to improved acid leaching conditions.

In addition to dissolving copper from the feed material, the leach circuit also dissolves numerous contaminants such as arsenic, antimony, bismuth, iron, zinc and molybdenum.

The number of stages included in the leach circuit depends upon the composition of the feed material. The more refractory the feed material, the more stages that will be required. FIG. 2 shows a three-stage leach circuit. The first stage is a weak acid leach of the readily soluble copper sulfates and oxides. The second stage is a strong acid leach which consumes excess ferric iron generated in the third stage as discussed below. The third stage is an oxidizing leach which utilizes ferric iron to leach that portion of the feed material which consists of the more refractory copper compounds.

As shown in FIG. 2, in the weak acid stage, contaminated, copper-bearing feed material is introduced as an aqueous solution to a weak acid reactor 30 via line 32. The feed material is combined in the weak acid reactor 30 with a leach solution which is introduced to the reactor 30 via line 34. The leach solution in the reactor 30 contains about 10-70 gpl sulfuric acid, preferably about 20-70 gpl sulfuric acid, and less than about 5 gpl ferric iron along with dissolved copper as copper sulfate. Preferably, this solution contains less than 0.5 gpl ferric iron, and most preferably is substantially free of ferric iron. The solution for the reactor 30 is supplied from the strong acid stage which is described below. The retention time in the weak acid reactor 30 is about 30-60 minutes while the temperature in the reactor is maintained at about 80° C. It should be understood that the weak acid reactor 30 can comprise a single vessel as shown in FIG. 2 or a plurality of vessels.

The slurry from the weak acid reactor 30 is directed via line 36 to a first stage thickener 38 wherein it is subjected to liquid-solids separation. The liquor from the thickener 38, which contains both dissolved copper as copper sulfate and dissolved contaminants and is hereinafter referred to as pregnant liquor, is directed via line 40 to a copper precipitation circuit described below. The solids from the thickener 38 are directed via line 42 to the strong acid stage.

The strong acid stage completes the leach of the readily acid-soluble minerals and starts the leach of minerals requiring higher acid content and an oxidant, e.g. ferric iron, for leaching. The leaching solution for the strong acid stage is supplied via line 44 from an oxidizing stage described below. The leaching solution enters a strong acid reactor 46 at about 85-120 gpl, preferably about 100 gpl, sulfuric acid and about 4-10 gpl, preferably about 8 gpl, ferric iron. The solution in the reactor 46 stabilizes at about 25-120 gpl, preferably about 65 gpl, sulfuric acid and about 0-6 gpl, preferably about 3 gpl, ferric iron. The retention time in the strong acid reactor 46 is about 45-120 minutes while the temperature of the reactor 46 is maintained at about 80° C. The strong acid reactor 46 can comprise a single vessel as shown in FIG. 2 or a plurality of vessels.

The slurry from the strong acid reactor 46 is directed via line 48 to a second stage thickener 50 wherein it is subjected to liquid-solids separation. The liquid from the thickener 50 is the leach solution supplied to the weak acid reactor 30 via line 34 and contains the dissolved copper and sulfuric acid needed in the weak acid stage.

The solids from the thickener 50 are directed via line 52 to the oxidizing stage wherein leaching of the more refractory copper compounds is obtained. In an oxidizing reactor 54, the solids from the strong acid stage are introduced to a leaching solution which initially contains greater than about 150 gpl, preferably greater than about 220 gpl, sulfuric acid. Make-up sulfuric acid and/or water are added to the oxidizing reactor 54 via lines 56 and 58, respectively, to maintain an average operating concentration of at least about 120 gpl sulfuric acid. The oxidizing reactor 54 has a retention time of about 180 minutes and is maintained at a temperature of about 80° C. As with the preceding steps of the leach circuit, the oxidizing reactor 54 can comprise a single vessel as shown in FIG. 2 or a plurality of vessels.

Addition of ferric iron to the oxidizing reactor 54 to maintain an EMF of greater than +400, preferably between about +430 and about +460, in the oxidizing leach solution is usually required to increase overall copper recoveries to above 95%. Some smelter flue dusts contain copper as a copper ferrite material. As this material is leached, ferric iron is released into the solution providing the oxidizing conditions required. Other flue dusts require that ferric iron be added.

As shown in FIG. 2, one method of adding ferric iron is by in-situ oxidation of ferrous sulfate, normally present in the third stage reactor 54 in a concentration of about 5-10 gpl $Fe^{+2}$, by oxygen sparging via line 60. In-situ generation of ferric iron can be accomplished at atmospheric pressures at 80° C. by sparging the agitated oxidizing leach slurry with oxygen gas at a concentration of 90% by volume. Ferric iron generation proceeds according to the reaction shown in Equation 3.

(3) $4FeSO_4 + O_2 + 2H_2SO_4 \rightarrow 2Fe_2(SO_4)_3 + 2H_2O$

Oxygen use efficiency is about 95% as long as the ratio $[Fe^{+3}]:[Fe^{+2}]$ is less than 0.80. If this ratio is maintained throughout the third stage, oxygen and acid requirements for generation of ferric sulfate are about 0.15 kg $O_2$ and about 0.88 kg $H_2SO_4$, respectively, per kg $Fe^{+3}$ required. Oxygen gas is utilized rather than air because air requires pressurized reactors (approximately 5 atmospheres) to achieve the same partial pressure of oxygen as that provided by the concentrated oxygen gas.

Sulfuric acid for the leach circuit can be supplied from an acid plant which is normally associated with smelters or can be supplied from tankhouse bleed electrolytes. The use of the liberator electrolytes not only supplies acid, but also delivers any copper which is contained in the electrolyte to the copper recovery process. Impurities contained in the electrolyte, which would normally co-deposit with copper in the liberator cathode and be sent to the smelter, are purged from the smelter circuit.

The slurry from the oxidizing reactor 54 is directed via line 62 to a third stage thickener 64 wherein it is subjected to liquids-solids separation. The liquid resulting from the liquid-solids separation, which contains dissolved copper sulfate and residual ferric iron, is the leach solution introduced via line 44 to the strong acid reactor 46.

The solids from the liquid-solids separator 64 are directed via line 66 to a filter 68 wherein they are washed and subjected to additional liquid-solids separation. The leach tailings from the filter 68 are directed via line 70 to the waste treatment circuit described below. Precious metals, such as gold and silver, which are contained in the feed material are not extensively leached in the leach circuit and concentrate in the leach tailings. The filtrate from filter 68 is combined via line 72 with liquid recycled via line 44 to the strong acid leach reactor 46.

Figure 3:
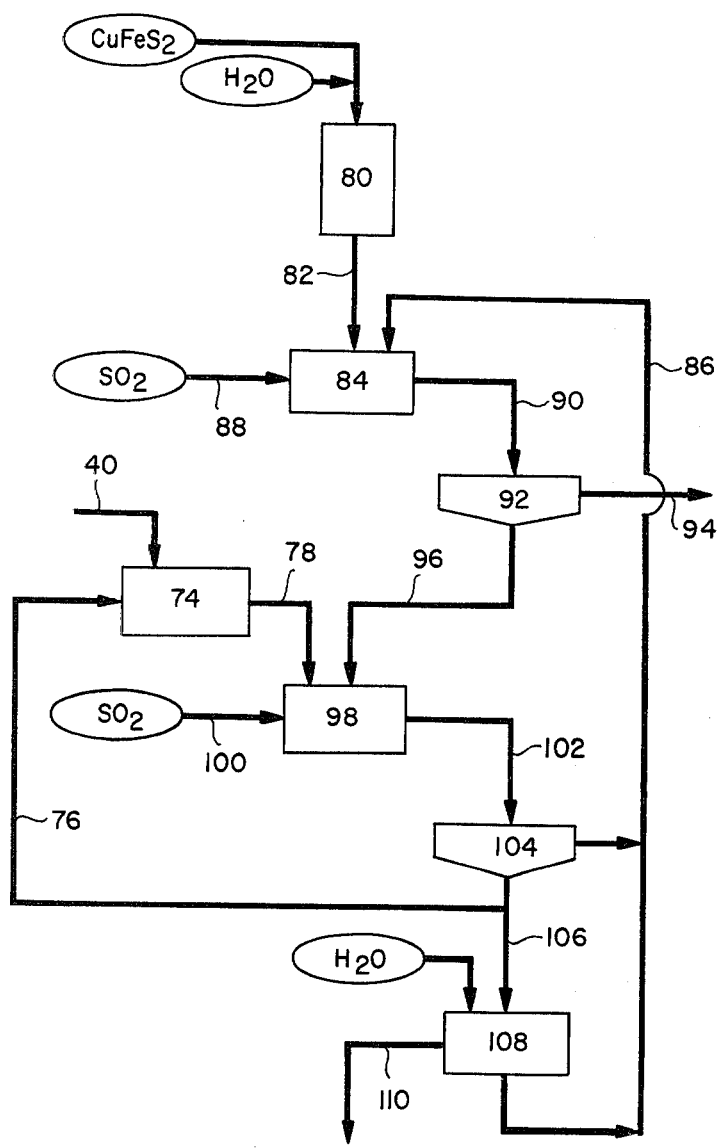
FIG. 3 is a schematic illustration of a precipitation circuit according to the present invention.

Referring to FIG. 3, the pregnant liquor from the weak acid stage of the leaching circuit, containing about 10-45 gpl dissolved copper, about 10-50 gpl sulfuric acid and less than about 5 gpl ferric iron, is introduced to the copper sulfide precipitation circuit via line 40.

The purpose of the precipitation circuit is to separate copper from the other components of the pregnant liquor, i.e. contaminants, by precipitating copper as simple copper sulfides, primarily covellite and digenite. In the precipitation circuit, copper is separated from the contaminants in the solution by reacting the pregnant liquor in a series of countercurrent precipitators with chalcopyrite concentrate and with sulfur dioxide dispersed into the resulting slurry. Equations 4-6 show the reactions which can occur in the precipitation circuit with the addition of chalcopyrite.

$$CuFeS_2 + CuSO_4 \xrightarrow{SO_2} 2CuS + FeSO_4 \quad (EQ\ 4)$$

$$CuFeS_2 + 2.6\ CuSO_4 + 1.6\ SO_2 + 3.2\ H_2O \longrightarrow \quad (EQ\ 5)$$
$$2Cu_{1.8}S + 3.2\ H_2SO_4 + FeSO_4$$

$$CuFeS_2 + 3CuSO_4 + 2SO_2 + 4H_2O \longrightarrow \quad (EQ\ 6)$$
$$2Cu_2S + 4H_2SO_4 + FeSO_4$$

Similar reactions can be obtained by using bornite rather than chalcopyrite as shown in Equation 7.

(EQ 7)
$$Cu_5FeS_4 + 3CuSO_4 + 2SO_2 + 4H_2O \rightarrow Cu_2S + FeSO_4 + 4H_2SO_4$$

The reaction rate in the precipitation circuit depends upon the EMF or oxidation potential due to ferric iron in solution at the time that sulfur dioxide additions are initiated. If there is a significant amount (0.5 gpl or more) of ferric iron in the solution at the time the sulfur dioxide additions are initiated, then the oxidation potential of the pregnant liquor/chalcopyrite slurry remains proportionately higher through the precipitation reaction compared with the oxidation potential of a slurry which initially contains little or no ferric iron. This means that, with ferric iron present, the precipitation reaction takes longer to go to completion. If large amounts of ferric iron are present initially, the precipitation reaction may never start.

Due to adverse effects of ferric iron on the precipitation reaction, the leach circuit, as discussed above, is preferably operated such that the resulting pregnant liquor is substantially free of ferric iron. To ensure that substantially all of the ferric iron in the pregnant liquor has been consumed prior to sulfur dioxide addition in the precipitation circuit, the pregnant liquor is reacted with a sufficient amount of recycled precipitation product prior to sulfur dioxide addition to reduce any ferric iron to ferrous. The measured EMF of the solution at the time of sulfur dioxide addition should be less than about +380 MV, preferably less than about +360 MV, as measured by a platinum electrode versus a calomel electrode.

As shown in FIG. 3, the pregnant liquor from the leach circuit is introduced via line 40 to an agitated vat 74 wherein it is mixed with precipitation product introduced to the vat 74 via line 76. Ferric iron contained in the pregnant liquor reacts with the copper sulfide precipitation product to lower the ferric iron concentration of the pregnant liquor to less than 0.5 gpl. Preferably, the pregnant liquor leaving the vat 74 is substantially free of ferric iron. The pregnant liquor along with residual precipitation products is directed via line 78 to the copper precipitation reaction stages of the precipitation circuit.

Chalcopyrite concentrate, or alternatively bornite, is slurried with water, ground to a desired mean particle size, preferably about 1.5-5 microns, in a grind mill 80 to increase surface area and reaction rates, and then introduced to an agitated, first stage precipitator 84 via line 82. An acidic copper sulfate solution is also introduced to the first stage precipitator 84 via line 86. Sulfur dioxide is sparged into the precipitator 84 via line 88 to facilitate the reactions shown in Equations 4-6 (Equation 7 if bornite is used) above.

Sulfur dioxide is added to the agitated precipitator 84 by sparging at the agitation level. Addition of the sulfur dioxide in this manner allows for good dispersion. About 120-140% of the theoretical stoichiometric amount of sulfur dioxide is required. The excess is required to saturate the solution to a concentration above that required to precipitate copper sulfide. The excess sulfur dioxide can be recovered by sparging the liquor with live steam and directing the resulting off gas back to the precipitator 84. Removal is facilitated by the high acid concentration of the liquor which lowers the sulfur dioxide solubility. Air stripping cannot be used because oxygen present with the sulfur dioxide slows the reaction rate and increases the sulfur dioxide requirements.

The precipitator 84 can comprise a single vessel as shown in FIG. 3, or a series of vessels.

The slurry from the first stage precipitator 84, which slurry comprises copper sulfide precipitation products, unreacted chalcopyrite (or bornite) and waste liquor, is directed via line 90 to a thickener 92 wherein it is subjected to liquid-solids separation. The waste liquor from the thickener 92 is directed via line 94 to the waste treatment circuit. The precipitation products and unreacted chalcopyrite (or bornite) are directed via line 96 to a second stage precipitator 98.

The pregnant liquor from the vat 74, substantially free of ferric iron, is introduced to the second stage precipitator 98 via line 78. Sulfur dioxide is introduced to the precipitator 98 via line 100 in the manner described above with respect to precipitator 84 to complete the reaction of the chalcopyrite (or bornite) solids according to Equations 4-6 (Equation 7 if bornite is used) to form additional copper sulfide precipitation products. The final precipitation products comprise primarily covellite and digenite.

The slurry from the precipitator 98 is directed via line 102 to a thickener 104 wherein it is subjected to liquid-solids separation. The liquid from the thickener 104, which liquid contains unreacted dissolved copper from the pregnant liquor, is directed via line 86 to the first stage precipitator. The copper sulfide precipitation products, comprising primarily covellite and digenite, are directed via line 106 to a filter 108 wherein they are washed with water and then directed to the recovery circuit via line 110. The filtrate from the filter 108 is combined with the dissolved copper solution utilized in precipitator 84.

Figure 7:
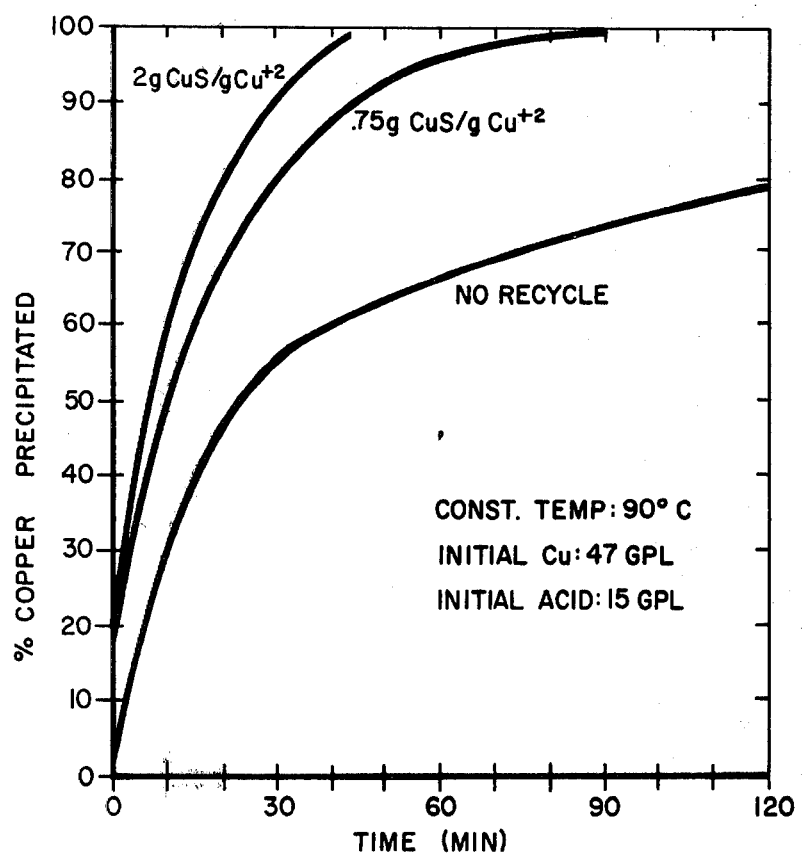
FIG. 7 shows a graph illustrating the effect of recycling precipitation product on the rate of copper precipitation.

As discussed above, a portion of the precipitation products are directed via line 76 to the vat 74 for reduction of ferric iron in the pregnant liquor and to increase copper precipitation rates by increasing the slurry density, as shown in FIG. 7.

The precipitation reaction is carried out at an initial maximum pH of 1.0 to keep the precipitation selective for copper and to leave impurities such as arsenic, bismuth, antimony, iron and zinc in solution. However, sulfuric acid is a product of the reaction. As its concentration increases, the reaction rate slows and it is difficult to reach completion. This is particularly true when initial copper concentrations in the pregnant liquor are in the range of about 45 gpl and result in a final sulfuric acid concentration of about 150 gpl.

The temperature of the solution in the precipitation circuit is maintained about 60° C. and below the boiling point of the solution.

The precipitation circuit recovers about 99.5 to 99.9% of the copper from the pregnant liquor while leaving the contaminants, which would degrade final copper quality, in the waste solution.

Figure 4:
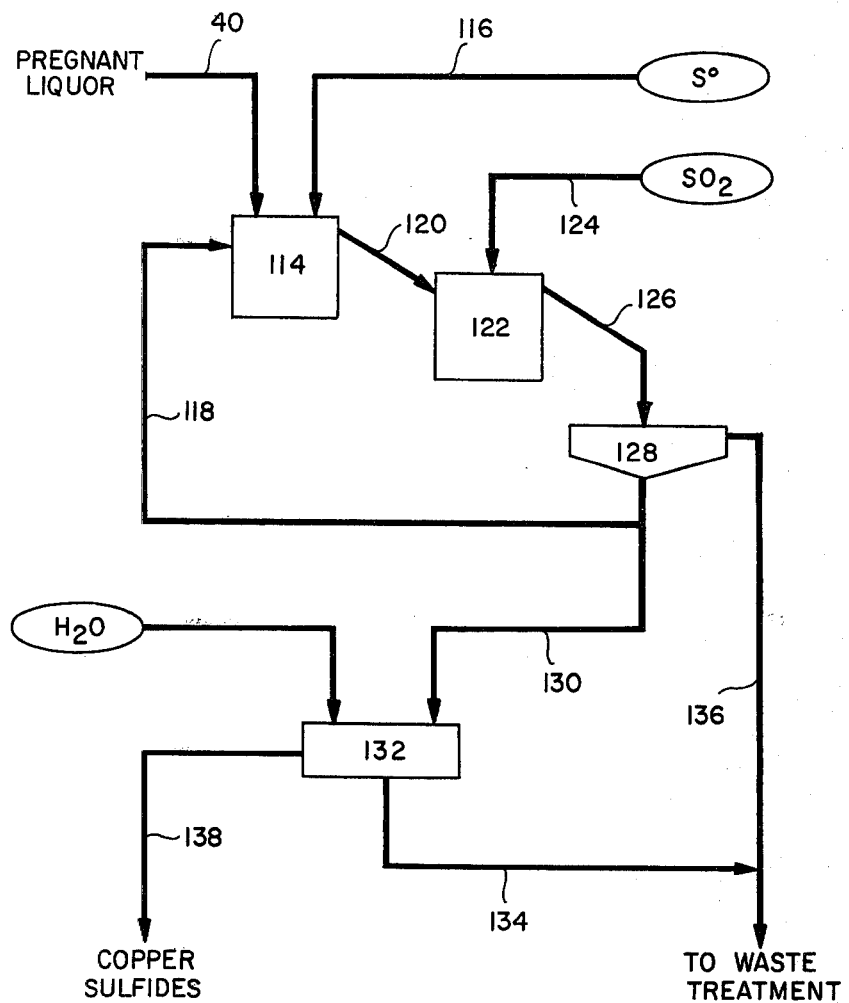
FIG. 4 is a schematic illustration of an alternative precipitation circuit.

According to an alternative precipitation circuit, shown in FIG. 4, the pregnant liquor from the leach circuit is introduced via line 40 to a first stage reaction vessel 114 and combined therein with elemental sulfur introduced via line 116 and recycled precipitation product introduced via line 118. The copper sulfide precipitation product reduces ferric iron prior to the sulfur dioxide addition but more importantly serves as an agent to increase the reaction rate in the acidic copper sulfate solution. Thus, any ferric iron contained in the pregnant liquor is reduced to ferrous such that the ferric iron concentration leaving the reactor vessel 114 is less than 0.5 gpl. Preferably, the pregnant liquor leaving the reactor vessel 114 is substantially free of ferric iron.

The slurry from the reactor vessel 114, which slurry comprises pregnant liquor, elemental sulfur and precipitation product, is introduced via line 120 to a second stage reactor vessel 122. Sulfur dioxide is sparged into the reactor vessel 122 via line 124 as described above to facilitate the reactions shown in Equations 1 and 2 above. The copper sulfide acts as a catalyst as long as elemental sulfur is present in at least 95% of the stoichiometric amount shown in Equation 8.

(EQ 8)
$$CuSO_4 + S° + SO_2 + CuS + 2H_2O \rightarrow 2CuS + 2H_2SO_4$$

Thus, elemental sulfur is added in an amount less than 100% of stoichiometric, preferably about 95% of stoichiometric.

The copper sulfide slurry from the reactors 122 is directed via line 126 to a thickener 128 wherein it is subjected to liquid-solids separation. The separated copper sulfide precipitation product is then directed via line 130 to a filter 132 wherein it is washed and filtered. Filtration is very rapid and therefore a good wash is possible. Final cakes typically run about 10-20% moisture after a short air dry. As stated above, a portion of the precipitation product is recycled to the first stage reactor vessel 114 via line 118. The filtrate from the filter 132 is mixed via line 134 with the liquid stream 136 from the thickener 128 and directed to the waste treatment circuit. The mixture contains all of the dissolved impurities removed from the feed material in the leach circuit. The copper sulfides from the filter 132 are repulped and directed via line 138 to the copper recovery circuit wherein commercial grade copper is recovered as described below.

Figure 5:
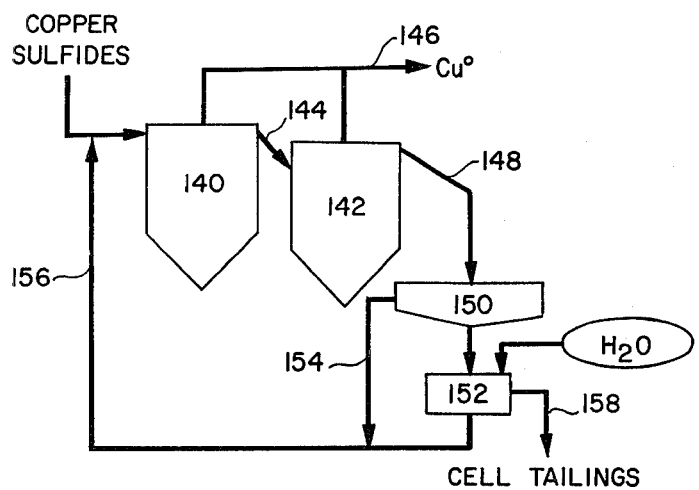
FIG. 5 is a schematic illustration of a slurry electrowinning circuit for recovering copper according to the present invention.

FIG. 5 shows a preferred copper recovery electrowinning circuit. In the electrowinning circuit, the copper sulfide precipitation products from the precipitation circuit are further diluted to about 6-7% solids with recycled electrolyte and introduced to an electrolytic recovery means. In the embodiment illustrated in FIG. 5, the electrolytic recovery means comprises a primary electrowinning cell 140 and a secondary electrowinning cell 142. The diluted copper sulfides are fed to the primary cell 140. The current density in the primary cell is maintained at about 1076 A/m². The retention time is about 2.5-3.0 hours. Overflow from the primary cell 140 enters the secondary cell 142 via line 144. The secondary cell 142 is operated at a current density of about 860-915 A/m². The retention time in the secondary cell 142 is about 1.0-1.5 hours. Residual solids exiting the secondary cell 142 contain about 10% copper and about 90% sulfur. Electrowon copper cathodes are produced at about 75% current efficiency and about 2.97 kWH/kg cu and periodically removed from the cells 140 and 142 as shown at 146.

Overflow from the secondary cells 142 is directed via line 148 to a thickener 150 and a filter 152. Countercurrent washing on a horizontal belt filter is preferred to prevent water from diluting the electrolyte which is removed from the thickener 150 via line 154 and returned to the cells via line 156. The degree of wash can be adjusted to allow various amounts of electrolyte to remain with the residual solids for the purpose of maintaining a desired amount of impurity bleed. Cell tailings may be returned via line 158 to the alternative copper precipitation circuit to supply sulfur for copper sulfide precipitation if the elemental sulfur precipitation reaction is used or may be recycled to the leach circuit to recover residual copper contained therein if the chalcopyrite precipitation reaction is used.

Table I shows the average analysis of cathodes produced according to the process of the subject invention during bench scale and pilot plant testing.

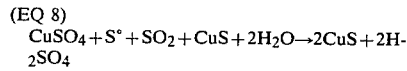

TABLE I

| Analysis of Slurry Electrowon Cathodes | | | | | |
|---|---|---|---|---|---|
| Cu % | Se ppm | Li ppm | Fe ppm | Te ppm | As ppm |
| 99.75-99.95 | 2 | 1 | 2-6 | 2 | 1 |
| Sb ppm | Au ppm | Ag ppm | Sn ppm | Bi ppm | |
| 3.2-1 | 1 | 5-1 | 2.5-2 | .3-.8 | |
| S° ppm | O_2 ppm | Pb ppm | | | |
| 10-1600 | 95-590 | 13-21.8 | | | |

The lead concentration is high due to the noncontinuous operation of the test cells. The shutdown of the cells between tests causes the formation of lead sulfate on the anode surface which contaminates the copper deposit in subsequent tests. The high levels of sulfur and oxygen are representative of tests in which the effect of high current densities during the initial 30 minutes of deposition was studied. In actual operation, current density is gradually increased to the operating level over the first 30 minutes to obtain a coherent base deposit and to increase the ferric iron concentration in the cell to about 2–3 gpl before copper solids are fed to the cell.

Figure 6:
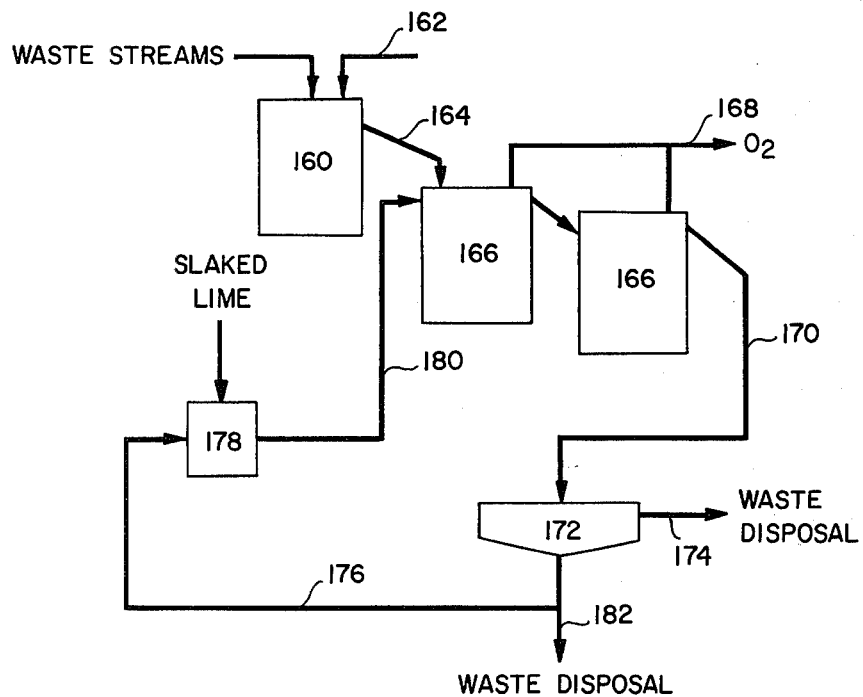
FIG. 6 is a schematic illustration of a waste treatment circuit utilized according to the present invention.

The waste treatment circuit, shown in FIG. 6 is used to neutralize the waste stream generated in the other circuits to a pH suitable for disposal. Limestone is added to a preneutralization vessel 160 via line 162 to raise the solution to a pH of about 5. The preneutralized waste is then directed via line 164 to a series of oxidation vessels 166 wherein ferrous iron is oxidized to ferric iron utilizing air or oxygen introduced to the vessels 166 via line 168 to facilitate complete iron precipitation. The neutralized waste, now at a pH of about 7, exits the oxidation vessels 166 via line 170 and is directed to a thickener 172 for liquid-solid separation. The waste liquor from the thickener 172 is directed to disposal or reuse via line 174. A portion of the solids from the thickener 172 is directed via line 176 to a vessel 178 wherein slaked lime is added in an amount required to maintain the pH in vessel 166 between about 7 and 8. The particles from vessel 178 are returned to the oxidation vessels 166 via line 180. This increases the size of the solid particles and makes it easier to process them in the thickener 172. The remaining solids from thickener 172 are directed via line 182 to disposal.

Normally adequate iron is available in the waste liquor to precipitate any arsenic present as iron arsenate. The increased particle size of the precipitated solids stabilizes the iron arsenate precipitate.

Investigations have shown that 98% recovery of copper from smelter flue dust is possible according to the process of the subject invention. At the same time, the process is effective for purging impurities from the flue dust to prevent degradation of the final copper product.

We claim:

1. A process for recovering copper from a contaminated copper-bearing source, comprising:
    a. leaching the copper-bearing source in an acidic leach solution to produce a liquor containing dissolved copper;
    b. precipitating simple copper sulfides from said liquor by reacting said liquor with chalcopyrite and sulfur dioxide; and
    c. recovering copper from said simple copper sulfides.

2. A process for recovering copper from a contaminated copper-bearing source, comprising:
    a. introducing the copper-bearing source to the first stage of a multi-stage countercurrent leach circuit, said circuit utilizing an acidic leach solution to produce a liquor containing dissolved copper, said circuit having a final stage wherein the leach solution contains greater than about 150 gpl sulfuric acid;
    b. precipitating simple copper sulfides from said pregnant liquor by reacting said liquor with chalcopyrite and sulfur dioxide; and
    c. recovering copper from said simple copper sulfides.

3. The process of claim 2 wherein said leach solution in said final stage of said leach circuit contains ferric iron for oxidizing more refractory copper compounds of said copper-bearing source, said ferric iron concentration being such that the EMF of said leach solution in said final stage is greater than +400.

4. The process of claim 3 wherein said ferric iron is generated in situ by introducing oxygen into said final stage for in situ oxidation of ferrous iron.

5. The process of claim 2 wherein said liquor is substantially free of ferric iron.

6. The process of claim 2 wherein said liquor is directed from said first stage of said leach circuit to a precipitation circuit wherein said liquor is combined with precipitation product such that substantially all ferric iron contained in said liquor is reduced to ferrous iron prior to the addition of sulfur dioxide to said liquor.

7. The process of claim 6 wherein the EMF of said liquor is less than about +380 MV at the time of sulfur dioxide addition.

8. The process of claim 7 wherein the temperature of said leach solution is about 80° C.

9. The process of claim 8 wherein said copper is recovered by electrolysis.

10. A process for precipitating simple copper sulfides from a solution containing both dissolved copper and one or more of an arsenic, antimony, bismuth, iron, zinc and molybednum contaminant while leaving the contaminant or contaminants in solution, comprising:
    (a) reacting solution containing dissolved copper and one or more contaminants with chalcopyrite solids and sulfur dioxide to precipitate copper from said solution as simple copper sulfides; and
    (b) combining part of said copper precipitate from step (a) with further solution to be reacted such that substantially all ferric iron contained in said solution is reduced to ferrous iron.

11. The process of claim 10 wherein the EMF of the solution resulting from step (a) of claim 10 is less than about +380 MV at the time of sulfur dioxide addition.

12. An apparatus for recovering copper from a contaminated copper-bearing source, comprising:
    a. means forming a leach circuit for leaching the copper-bearing source in an acidic leach solution to produce a liquor containing dissolved copper;
    b. means forming a precipitation circuit wherein said liquor is reacted with chalcopyrite solids and sulfur dioxide to precipitate copper from said liquor as simple copper sulfides; and
    c. means forming a copper recovery circuit for recovering copper from said simple copper sulfides.

* * * * *